(12) United States Patent
Franklin et al.

(10) Patent No.: US 10,354,001 B2
(45) Date of Patent: Jul. 16, 2019

(54) CELL ERROR TRACKING IN APPLICATIONS

(71) Applicant: APPLE INC., Houston, CA (US)

(72) Inventors: David G. Franklin, Glenshaw, PA (US); Michael J. Coblenz, Sunnyvale, CA (US)

(73) Assignee: Apple, Inc., Cupertino, CA (US)

( * ) Notice: Subject to any disclaimer, the term of this patent is extended or adjusted under 35 U.S.C. 154(b) by 807 days.

(21) Appl. No.: 14/160,221

(22) Filed: Jan. 21, 2014

(65) Prior Publication Data

US 2015/0205659 A1   Jul. 23, 2015

(51) Int. Cl.
*G06F 17/00* (2019.01)
*G06F 17/24* (2006.01)
*G06F 11/07* (2006.01)

(52) U.S. Cl.
CPC .......... *G06F 17/246* (2013.01); *G06F 11/079* (2013.01); *G06F 11/0742* (2013.01)

(58) Field of Classification Search
CPC ............................. G06Q 10/10; G06F 17/246
USPC ......................................... 715/212, 219, 200
See application file for complete search history.

(56) References Cited

U.S. PATENT DOCUMENTS

| | | | |
|---|---|---|---|
| 5,842,180 A | 11/1998 | Khanna et al. | |
| 6,317,758 B1 | 11/2001 | Madsen et al. | |
| 7,117,430 B2 | 10/2006 | Maquire, III et al. | |
| 8,321,780 B2 * | 11/2012 | Erwig | G06F 17/246 715/212 |
| 2002/0023105 A1 * | 2/2002 | Wisniewski | G06F 17/246 715/212 |
| 2007/0011211 A1 | 1/2007 | Reeves | |
| 2007/0256004 A1 * | 11/2007 | Payette | G06F 17/246 |
| 2008/0168341 A1 * | 7/2008 | Payette | G06F 17/246 715/212 |

OTHER PUBLICATIONS

Global Knowledge, Microsoft Office Excel 2007—Level 4, published 2008, Global Knowledge Software LLC—Villanova Unit Training, pp. 1-256.*
Tech on the Net, MS Excel: Create a Hyperlink to Another Cell in Excel 2010, wayback date published Jan. 5, 2014, Tech on the Net, pp. 1-2 (pdf).*
Excel 2010 Screenshots, Microsoft Office Excel Software Screenshots, copyright 2010, Microsoft Corporation, pp. 1-6 (pdf)).*
Harvey et al,; "Understanding Excel 2010's Formula Auditing Tools", 2013, from "Excel 2010 All-in-One for Dummies" found at http://www.dummies.com/how-to/content/understanding-excel-2010s-formula-auditing-tools.html.

* cited by examiner

*Primary Examiner* — Manglesh M Patel
(74) *Attorney, Agent, or Firm* — Fletcher Yoder PC

(57) ABSTRACT

Embodiments are disclosed in which an algorithm that evaluates the contents of a cell within an application incorporates error tracking. In certain such embodiments, a second cell is identified that is responsible for generation of an error indication within the cell. A link may be provided to the second cell to facilitate resolution of the error condition.

24 Claims, 8 Drawing Sheets

|   | A | B |
|---|---|---|
| 1 | FORMULA EVALUATED | FORMULA AS PLAIN TEXT |
| 2 | ⚠ ~150 | = 1 / 0 |
| 3 | ⚠ ~150 | = A2 |
| 4 | 170~ ⚠ | = A3 |
| 5 | ⚠ | = A4 |

110   110   FIG. 6

|   | A | B |
|---|---|---|
| 1 | FORMULA EVALUATED | FORMULA AS PLAIN TEXT |
| 2 | <u>164</u>  ⚠ ~150 | = 1 / 0 |
| 3 | ⚠ ~150 | = A2 |
| 4 | 170~ ⚠  ~110 | = A3 |
| 5 | ⚠ | = A4 |

⚠ CELL "A2" CONTAINS AN ERROR.

160   162   110   FIG. 7

CELL ERROR TRACKING IN APPLICATIONS

BACKGROUND

The present disclosure relates generally to error tracking within a table of an application, such as a spreadsheet application.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Spreadsheet applications, as well as other types of applications, may use rows and columns of cells (such as tables of such cells) to allow a user to enter or manipulate data for calculation or presentation. Tables of cells used in such applications may range from a limited number of cells in simple or straightforward implementations to having a large number of cells in more complex scenarios. To allow a user greater flexibility, it is not uncommon for an application to allow a cell (or a formula defined within a cell) to reference other cells within a spreadsheet or table for values, calculations, or formulas defined within the referenced cells. For example, one cell may contain a formula for adding or otherwise mathematically manipulating a set of values that are defined in other cells of a spreadsheet.

One consequence of such cell referencing is that an error in one cell may result in downstream errors in cells that reference the error containing cell. In complex situations where multiple cells are referenced by a given cell or where a chain or sequence of cells reference one another or a sequence of cells, it may be difficult to identify which cell or cells contain errors as both the error-causing cell and the referencing cells may be tagged as having an error. Thus, the convenience of being able to reference other cells in a formula or calculation may be offset by the difficulty that may arise in troubleshooting such an arrangement when errors exist in one or more of the referenced cells. In such instances, troubleshooting the referenced cells to locate the errors may be a tedious and time consuming endeavor.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments are discussed and described that facilitate tracking and localization of errors, such as root cause errors, within cells of a table, such as a table of a spreadsheet application. In one implementation, a cell containing a formula or calculation may reference one or more additional cells, any one of which may contain errors rendering the formula or calculation unsolvable. In certain implementations, an evaluation routine may be invoked or executed to evaluate a selected cell. The evaluation routine includes or incorporates error tracking logic which, in the event an error is detected that is not present in the selected cell itself, tracks the error to an ultimate or root cause source. The root cause of the error may be a cell that is either directly or indirectly referenced by the cell undergoing evaluation, i.e., the selected cell. In one embodiment, the error tracking is initiated in response to an error indicator being selected or interacted with in the selected cell. In one embodiment, a selectable link is generated and displayed which, when selected, causes selection of the cell having the root cause error.

BRIEF DESCRIPTION OF THE DRAWINGS

Various aspects of this disclosure may be better understood upon reading the following detailed description and upon reference to the drawings in which:

FIG. 6 depicts an example screenshot of a spreadsheet application in which an error in a first cell is propagated through a number of referencing cells;

FIG. 7 depicts an example of an error description message in accordance with aspects of the present disclosure;

DETAILED DESCRIPTION OF SPECIFIC EMBODIMENTS

Figure 1:
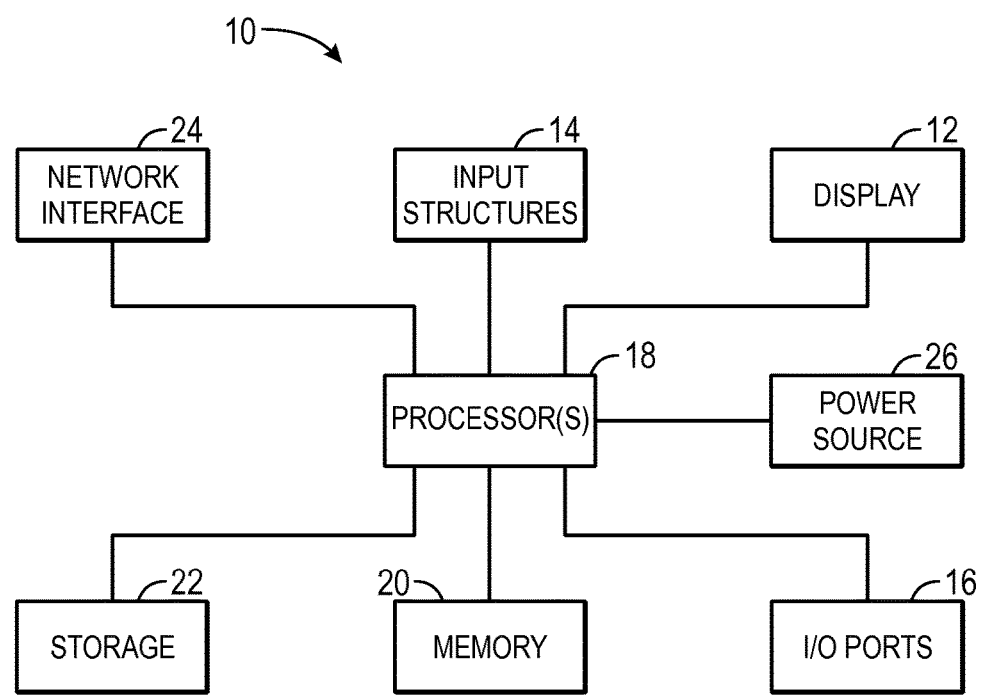
FIG. 1 is a block diagram of an electronic device that may use the techniques disclosed herein, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The disclosure is generally directed to providing information to a user that allows errors within a cell of a spreadsheet or table to be traced to the underlying (i.e., root) cause. For example, in one implementation, a cell containing a formula or calculation may reference one or more additional cells, any one of which may contain errors, such as impermissible values, unsolvable formulas, erroneous references, clerical or typing errors, and so forth. In such a circumstance, a formula may be unsolvable due to the erroneous contents within the formula itself or due to one or more errors within cells referenced by the formula. In certain implementations, an evaluation routine may be invoked or executed to evaluate a selected cell, where the evaluation routine includes or incorporates error tracking logic. In this manner, as part of the cell or formula evaluation process (such as may be applied when a formula is first entered into a cell), any errors present in the selected cell itself or in cells directly or indirectly referenced by the selected cell may be identified. A determination is thereby made of the cells or cells responsible for generating an error within the selected cell and an indication of the error-causing cell is provided to the user.

In one embodiment, this information could be used to not only identify the error-causing cell, but also to generate a link to the error-causing cell to facilitate correction. For example, a button or other selectable control can be provided which, when selected or activated by the user, takes the user to the error-causing cell (i.e., selects the error-causing cell and displays the cell contents in an edit box for correction).

Further, to the extent that multiple cell errors are present, such as due to a sequence or chain of interrelated references, embodiments of the present approach may be provided that facilitate identification of the root cause of the displayed errors. For instance, in an example where a first cell (e.g., cell A1) contains an error (e.g., a division by zero error) this error may propagate through a sequence of cells that directly or indirectly reference the error containing cell. In instances where the reference to the error-causing cell is direct (i.e., the contents of a cell directly reference the error-causing cell), the identification of the error-causing cell may be straightforward. However, in instances where the reference to the error-causing cell is indirect (i.e., the contents of a cell reference one or more intermediary cells which may in turn directly or indirectly reference the error-causing cell), the identification of the error-causing cell may be more difficult as a given cell may merely point to an intermediary cell as providing the erroneous value. In accordance with certain embodiments, a root cause is instead provided to the user that correctly identifies the cell containing the erroneous values, as opposed to identifying intermediary cells that merely reference the root cause error cell. As noted above, in such embodiments, a link or button may be provided to take a user directly to the root cause error cell, thereby bypassing any intermediary cells through which the root cause error is merely propagated.

Figure 2:
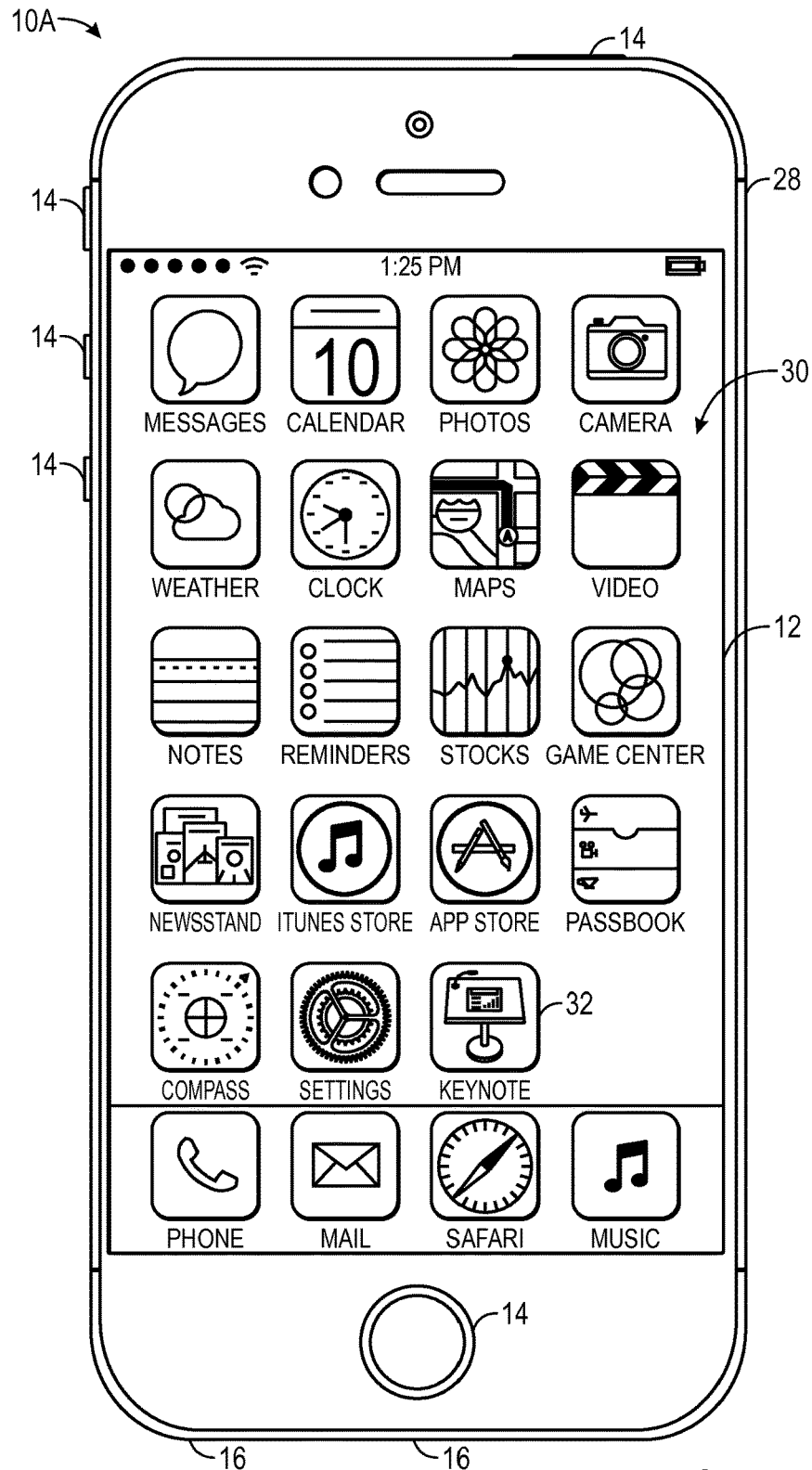
FIG. 2 is a front view of a handheld device, such as an iPhone® by Apple Inc., representing an example of the electronic device of FIG. 1.
Figure 3:
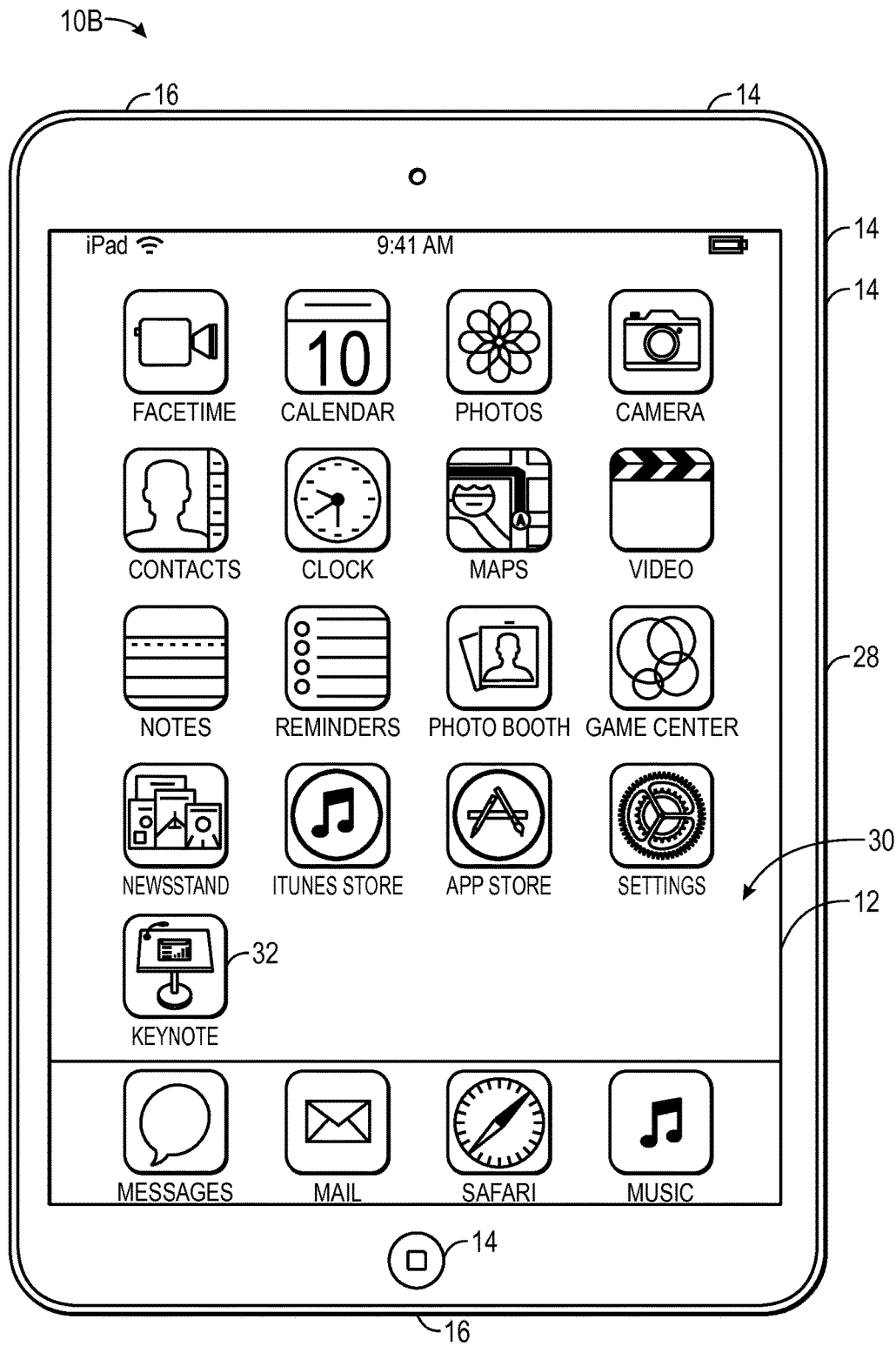
FIG. 3 is a front view of a tablet device, such as an iPad® by Apple Inc., representing an example of the electronic device of FIG. 1.
Figure 4:
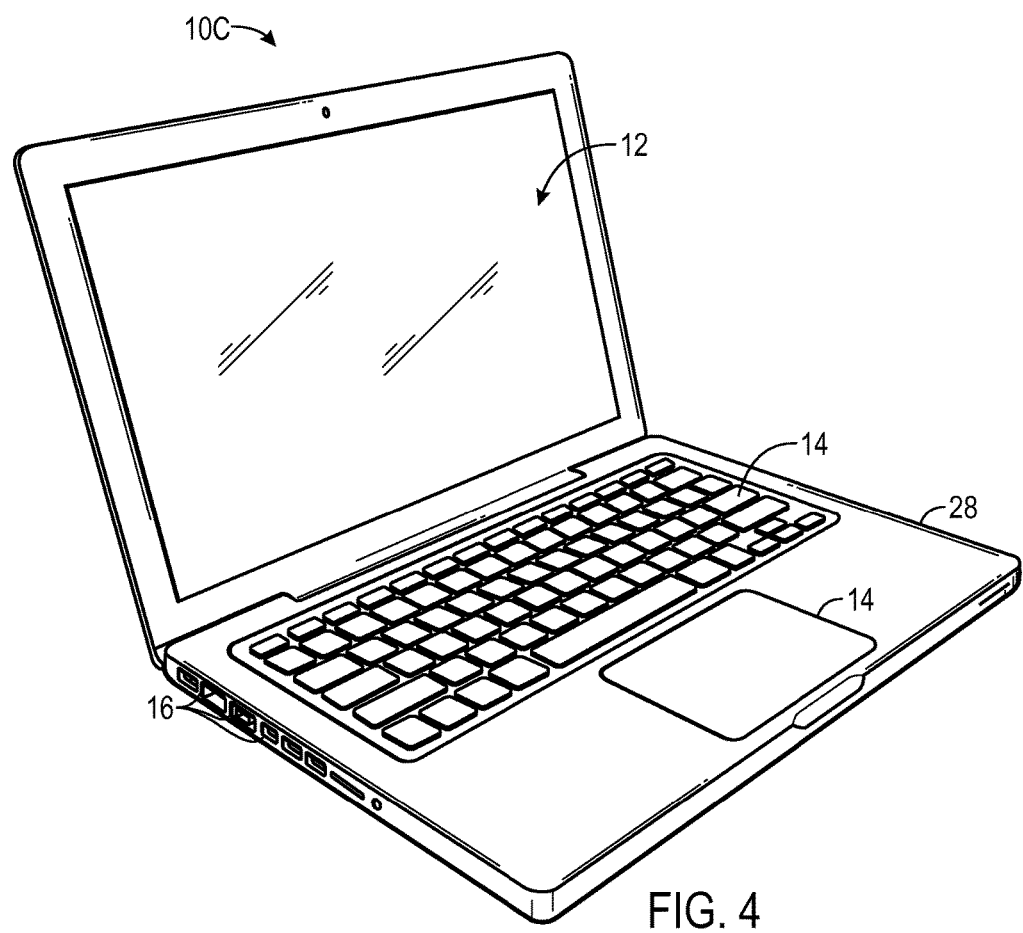
FIG. 4 is a perspective view of a notebook computer, such as a MacBook Pro® by Apple Inc., representing an example of the electronic device of FIG. 1.

A variety of suitable electronic devices may employ the techniques described herein when executing or interacting with a spreadsheet application or other application employing cells or tables of such cells. FIG. 1, for example, is a block diagram depicting various components that may be present in a suitable electronic device 10 that may be used in the implementation of the present approaches. FIGS. 2, 3, and 4 illustrate example embodiments of the electronic device 10, depicting a handheld electronic device, a tablet computing device, and a notebook computer, respectively.

Turning first to FIG. 1, the electronic device 10 may include, among other things, a display 12, input structures 14, input/output (I/O) ports 16, one or more processor(s) 18, memory 20, nonvolatile storage 22, a network interface 24, and a power source 26. The various functional blocks shown in FIG. 1 may include hardware elements (including circuitry), software elements (including computer code stored on a non-transitory computer-readable medium) or a combination of both hardware and software elements. It should be noted that FIG. 1 is merely one example of a particular implementation and is intended to illustrate the types of components that may be present in the electronic device 10. Indeed, the various depicted components (e.g., the processor(s) 18) may be separate components, components of a single contained module (e.g., a system-on-a-chip device), or may be incorporated wholly or partially within any of the other elements within the electronic device 10. The components depicted in FIG. 1 may be embodied wholly or in part as machine-readable instructions (e.g., software or firmware), hardware, or any combination thereof.

By way of example, the electronic device 10 may represent a block diagram of the handheld device depicted in FIG. 2, the tablet computing device depicted in FIG. 3, the notebook computer depicted in FIG. 4, or similar devices, such as desktop computers, televisions, and so forth. In the electronic device 10 of FIG. 1, the display 12 may be any suitable electronic display used to display image data (e.g., a liquid crystal display (LCD) or an organic light emitting diode (OLED) display). In some examples, the display 12 may represent one of the input structures 14, enabling users to interact with a user interface of the electronic device 10. In some embodiments, the electronic display 12 may be a MultiTouch™ display that can detect multiple touches at once. Other input structures 14 of the electronic device 10 may include buttons, keyboards, mice, trackpads, and the like. The I/O ports 16 may enable electronic device 10 to interface with various other electronic devices.

The processor(s) 18 and/or other data processing circuitry may execute instructions and/or operate on data stored in the memory 20 and/or nonvolatile storage 22. The memory 20 and the nonvolatile storage 22 may be any suitable articles of manufacture that include tangible, non-transitory computer-readable media to store the instructions or data, such as random-access memory, read-only memory, rewritable flash memory, hard drives, and optical discs. By way of example, a computer program product containing the instructions may include an operating system (e.g., OS X® or iOS by Apple Inc.) or an application program (e.g., Numbers® by Apple Inc.).

The network interface 24 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The power source 26 of the electronic device 10 may be any suitable source of energy, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 28 to protect interior components from physical damage and to shield them from electromagnetic interference. The enclosure 28 may surround the display 12, which may display a graphical user interface (GUI) 30 having an array of icons 32. By way of example, one of the icons 32 may launch a spreadsheet application program (e.g., Numbers® by Apple Inc.). User input structures 14, in combination with the display 12, may allow a user to control the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Touchscreen features of the display 12 of the handheld device 10A may provide a simplified approach to controlling the spreadsheet application program. The handheld device 10A may include I/O ports 16 that open through the enclosure 28. These I/O ports 16 may include, for example, an audio jack and/or a Lightning® port from Apple Inc. to connect to external devices. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a display 12, input structures 14, I/O ports 16, and a housing 28. In one embodiment, the input structures 14 (e.g., a keyboard and/or touchpad) may be used to interact with the computer 10C, such as to start, control, or operate a GUI or applications (e.g., Numbers® by Apple Inc.) running on the computer 10C.

With the preceding in mind, a variety of computer program products, such as applications or operating systems, may use or implement the techniques discussed below to enhance the user experience on the electronic device 10. Indeed, any suitable computer program product that provides for the use or manipulation of cells within a table or spreadsheet, including the referencing of other cells from a given cell, may employ some or all of the techniques discussed below. For instance, the electronic device 10 may store and run a spreadsheet application 34 (e.g., Numbers® from Apple Inc.). The spreadsheet application may be stored as one or more executable routines (which may encode and implement the actions described below) in memory and/or storage (FIG. 1). These routines, when executed, may cause control codes and logic as discussed herein to be implemented and may cause screens as discussed herein to be displayed on a screen of the electronic device or in communication with the electronic device.

Figure 5:
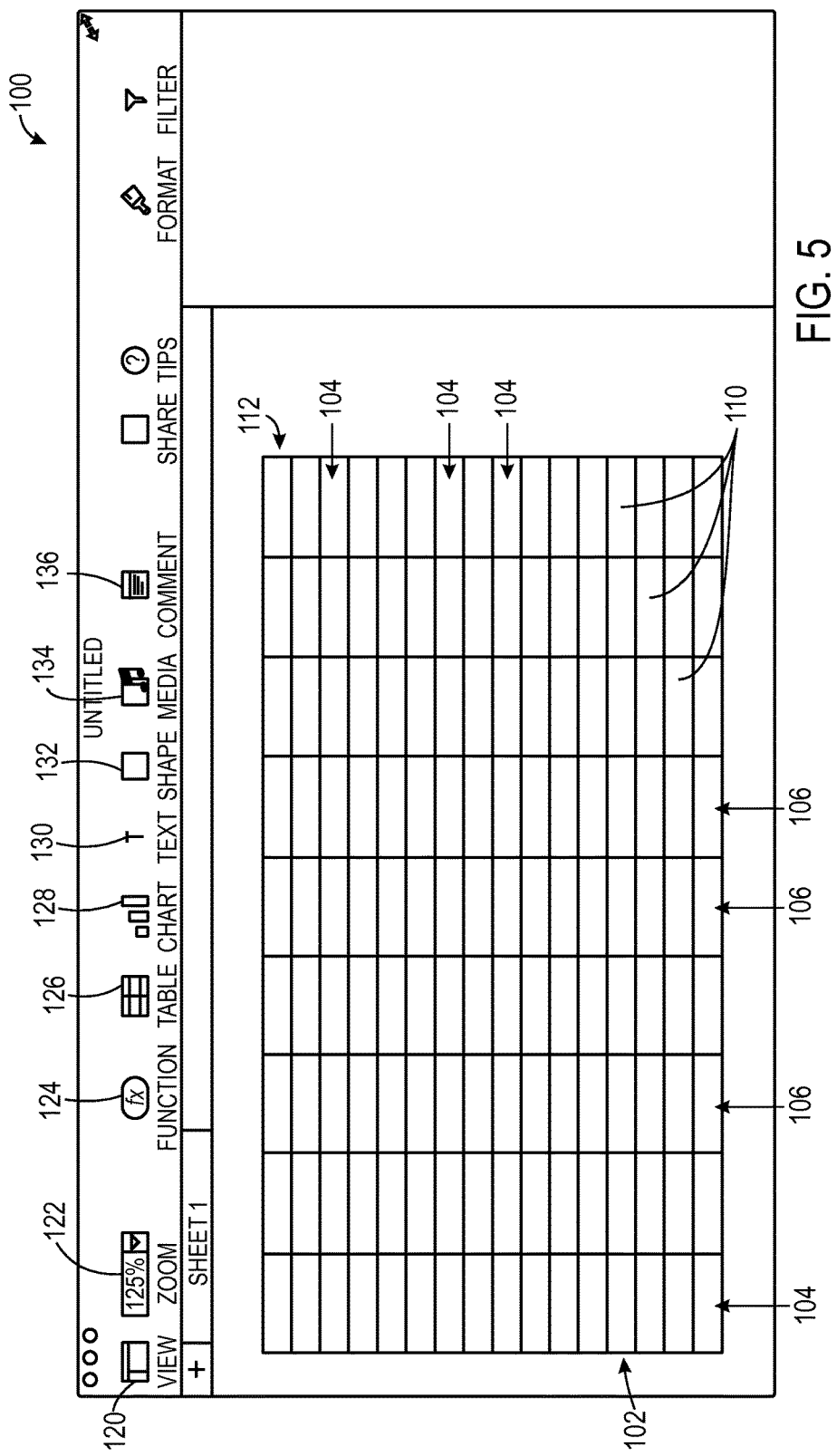
FIG. 5 illustrates an example of a screen of a spreadsheet application in accordance with aspects of the present disclosure.

Turning to FIG. 5, an example of a spreadsheet application interface screen 100 is depicted which includes a table 102 having rows 104 and columns 106 of cells 110. Upon selection of a cell 110 within the table 102, a user may be provided a prompt or other entry box by which text, numbers, formula, and so forth may be entered as the contents of a cell 110 or by which the existing contents of a cell 110 may be edited or modified. In the depicted example, the uppermost row 112 and leftmost column 114 may be set aside or visually distinguished to allow this row and column to display row or column headings or labels. Further, row and column address indicators or indexes may also be displayed that may be automatically populated with an index of column addresses or headers (e.g., A, B, C, D, and so forth) or, respectively, with an index of row addresses or headers (e.g., 1, 2, 3, 4, and so forth). In this manner an addressing scheme may be provided for each cell 110 within the table 102 such that individual cells may be identified by column and row address (e.g., A1, B3, D30, and so forth).

In addition, the interface screen 100 may include an interface bar 120 that includes buttons, menus, drop down boxes, and so forth that a user may interact with to invoke various functions within the spreadsheet application. By way of example, in the depicted screen 100, a magnification control 122, function entry button 124, table button 126, chart button 128, text box button 130, shape button 132, media button 134, and comment button 136 are provided. By interacting with these various controls, the user may insert a new table (such as via selection of the table button 126), select a function for use in a cell (such as via selection of the function button 124), insert a comment (such as via selection of the comment button 136), and so forth).

As discussed above, in certain instances a cell 110 within a table 102 may contain an error, such as due to a user misentering a formula or value or due to an entered formula returning an unacceptable or unparsable response. Existing approaches do not guarantee that the cell determined to be responsible for an error message are actually necessary for the evaluation of a selected cell. As a result, such existing approaches are not reliable debugging tools for a user seeking to track down errors within a spreadsheet. Contrary to these existing approaches, and in accordance with present embodiments, the evaluation logic and routines associated with a spreadsheet application in accordance with the present disclosure allow an error-causing cell to be accurately identified and/or to accurately determine if the error in question originates in the formula being evaluated itself.

In particular, by extending the evaluation system used to evaluate programming language (e.g., formulas) within the spreadsheet application, present embodiments accurately track and report the root cause cell that is the cause of an error if an error exists. For example, in one embodiment the contents of a cell, such as a formula, are evaluated upon entry into a cell by a cell or formula evaluation routine. As soon as a reference error is reported during evaluation of a cell's contents the location (e.g., address) of the referenced cell may be recorded or reported to the user. That is, the error is reported concurrent with evaluation of the cell contents. In particular, in accordance with certain embodiments, the error tracking performed in conjunction with formula evaluation within a selected cell may walk through a chain of references to identify a root error-causing cell responsible for an error in the selected cell. Such error tracking may be performed when a cell is selected or when an error indicator displayed with such a cell is selected. Alternatively, the results of such error tracking may be stored at an earlier time and displayed when the user subsequently interacts with an error indicator for the selected cell. Thus, in this manner, the formula evaluation routines or module is used to indicate a root cause for an error in the form of a location for the error-causing cell, as opposed to an intervening or intermediary referenced cell.

With the preceding in mind, one example of an implementation is described to facilitate explanation. In particular, turning to FIG. 6, an example of one embodiment is described in which cells A2 through A5 of column A contain formulas that each generate an error indication 150. Corresponding cells B2 through B5 each depict the formula defined in the corresponding column A cells for the purpose of illustrating this example. For example, the formula "=1/0" has been entered into cell A2, while cell A3 has been set to equal the value derived in cell A2 (i.e., "=A2"). Thus the content of cell A3 directly reference cell A2. Similarly, cell A4 has been set to equal the value derived in cell A3 (i.e., "=A3") and cell A5 has been set to equal the value derived in cell A4 (i.e., "=A4"). That is, cell A4 directly references cell A3, cell A5 directly references cell A4, and both cells A4 and A5 indirectly reference cell A2 via intermediary cells.

Because cell A2 contains a mathematical error (i.e., a division by zero error), all of cells A2 through A5 contain errors due to either containing the error itself (i.e., cell A2), directly referencing the error containing cell (i.e., cell A3), or indirectly referencing the error containing cell (i.e., cells A4 and A5). Because each of cells A2 through A5 contain errors, a selectable error indicator 150 is displayed in each of cells A2 through A5, though ultimately the root cause of the error in each cell is the mathematical error (i.e., division by zero) present in cell A2. That is, cell A2 contains the underlying or root error that must be resolved before any of the remaining cells that reference cell A2, directly or indirectly, may be successfully evaluated.

In the present example, the root cause error is disclosed to a user if or when an error indicator 150 in any of cells A3 through A5 is selected (depicted via the selection box 170 disposed about cell A5). For example, in the present implementation, if the error indicator 150 in cell A5 is selected by the user, the formula evaluation routine may trace an error back to determine the root cause in the form of an error-causing cell that is the ultimate source of the error indication.

Alternatively, in other embodiments, selection of the error indicator 150 may simply access a stored indication of the type of error and the location of the error-causing cell. That is, an initial or earlier formula evaluation result indicating one or both of the error-causing cell or a description of the error may be stored and subsequently accessed and displayed when an error indicator 150 is selected. Thus, in differing implementations, error tracking may be performed dynamically in response to selection of an error indicator 150 (thus minimizing data storage requirements but involving some processing overhead that scales linearly with respect to the length of the error chain) or may be stored after a prior evaluation of the contents (e.g., a formula) of a cell (e.g., a referenced cell or a root cause cell) and subsequently accessed in response to selection of the error indicator 150 in a current cell (thus increasing data storage requirements but reducing processing overhead). As will be appreciated, benefits of accessing stored error information is not simply a matter of caching. Instead, because the referenced cells have already been evaluated at the time a given cell is undergoing evaluation, the root error causes associated with the referenced cells may already be stored and it may simply be a matter of copying such stored information from the source cell (if applicable). Thus, in such embodiments every root cause can be computed in constant time per cell rather than in linear time per cell.

Based on this error tracking, either performed dynamically or previously, an error description box 160, as depicted in FIG. 7, is displayed. In particular, in the depicted example the error description provided in error description box 160 that is generated when the error indicator 150 in cell A5 is selected correctly identifies cell A2 as containing the error, despite cell A5 containing no direct reference to cell A2.

Thus, in the depicted example the error description box correctly reports the location of the root cause cell (i.e., cell A2) containing the error. Error description boxes 160 displaying the same message would likewise be invoked and displayed if the error indicators 150 in any of cells A3 or A4 were selected, though the error description box 160 may be repositioned to clearly reference the cell 110 containing the selected error indicator 150. In varying embodiments, the error description may identify the error-causing cell based on a row or column address index (e.g., A2) or, if available, based on a row or column header or title assigned by the user (such as "Formulae Evaluated" in the depicted example).

As will be appreciated, the cell containing the root cause error (here cell A2) will display an error indicator 150 which, if selected will provide a description of the root cause error. However, as shown in this example, error indicators 150 are also displayed in those cells 110 that contain errors due to either directly or indirectly referencing the root cause cell. With this in mind, if the selected error indicator 150 is present in a cell that references the root cause error (i.e., cells A3, A4, or A5) (as opposed to containing the root cause error itself (i.e., cell A2)), a selectable button or link 162 (e.g., a hyperlink, such as a hyperlink conveying the location or identity of the error-causing cell) may be provided in the error description box 160. That is, if the error description message references a cell other than the cell from which the error indicator was selected, a selectable link 162 will be provided to the cell that contains the error. When the link or button 162 is selected, the error-causing cell 164 (here cell A2) is selected.

In certain embodiments, instead of or in addition to the error description box 160 being displayed, the error containing table 102 and cells 110 may be displayed in conjunction with dependency lines. In one embodiment, such dependency lines may be displayed in response to an error indicator 150 being selected, such as after error tracking is performed in response to the error indicator being selected. Such dependency lines would accurately interconnect and depict how a selected cell (such as cell A5 in FIG. 7) depends on the error-causing cell 164. That is, in such embodiments, the dependency lines would be drawn to indicate the correct chain of references between the selected cell and the error-causing cell and would, therefore, terminate at the error-causing cell 164.

Figure 8:
FIG. 8 depicts the selection of an error-causing cell in accordance with aspects of the present disclosure.
Figure 9:
FIG. 9 depicts an example of an error description message for an error-causing cell in accordance with aspects of the present disclosure.

In response to selection of the error-causing cell 164, such as after interaction with selectable link 162, the spreadsheet application view may change to display the newly selected cell, as shown in FIG. 8. In one embodiment, once the error-causing cell 164 is selected and in-view, the error indicator 150 within the error-causing cell may be selected to display an error description box 160 identifying the root error. Such a message corresponding to the present example is shown in FIG. 9.

Figure 10:
FIG. 10 depicts the result of correcting an error within an error-causing cell in accordance with aspects of the present disclosure.

Once the nature and location of the root cause error are known, the error may be corrected. The corrected formula can then be re-evaluated, along with all cells which depended directly or indirectly on the cell that contained the error. For example, turning to FIG. 10, the contents of cell A2 may be corrected to address the division by zero error, thereby resolving all errors attributable to the error that previously existed in cell A2.

As will be appreciated, it is possible that an error-causing cell contains more than one error. Thus, resolving a first indicated error may still leave the error-causing cell unable to be successfully evaluated due to the remaining errors. In such a case, after resolution of a first error, an error indicator 150 may continue to be displayed in the error-causing cell (as well as in the cells referencing the error-causing cell). In such circumstances, a user may simply select the respective error indicator to cause display of additional error description(s) and to correct the indicated error(s) until no additional errors are indicated as being present.

Figure 11:
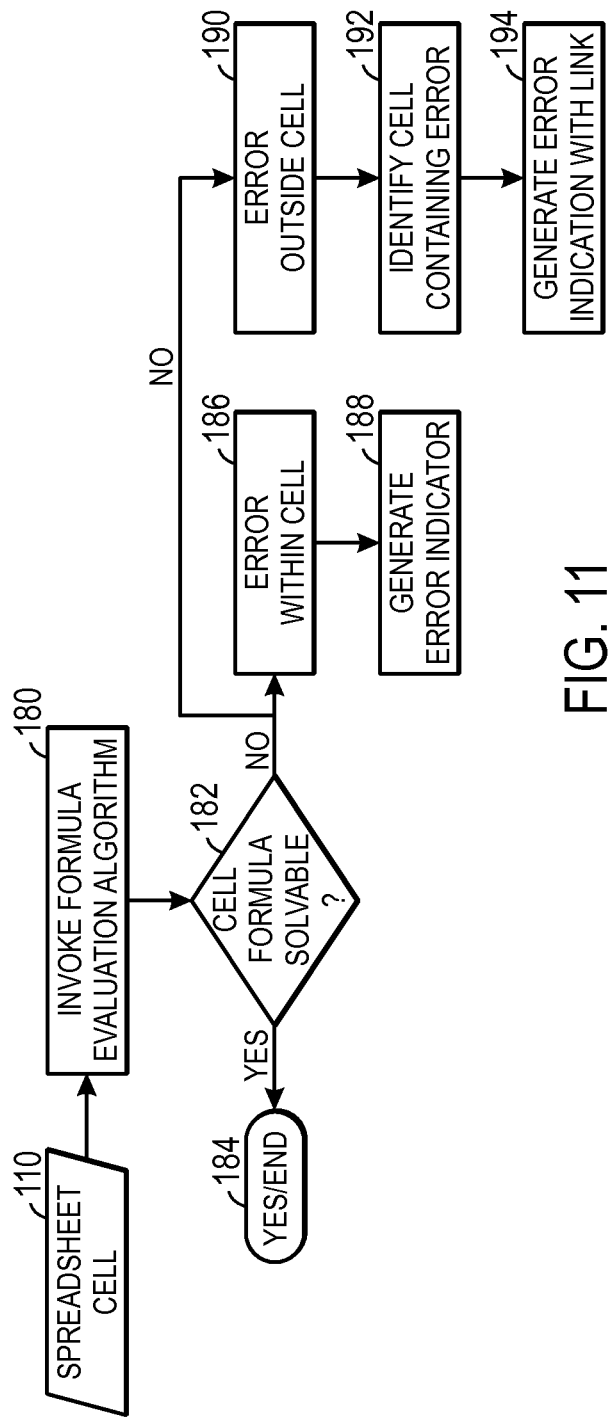
FIG. 11 depicts a process flow depicting control logic for implementing one of more embodiments of the present disclosure.

With the preceding in mind, FIG. 11 depicts steps and control logic that may be implemented as routines within a spreadsheet application that provide error reporting as discussed herein when executed on a processor-based system. In this example, a formula or other contents subject to verification is entered into a spreadsheet cell 110. Upon entry of these contents, the spreadsheet cell 110 is subject to evaluation, such as by a cell contents (e.g., formula) evaluation system that may be invoked (block 180). A determination is made by the evaluation routines as to whether the cell formula (or other contents) are solvable (block 182). If solvable, the evaluation routine may terminate (block 184).

Conversely, if the cell contents are determined to not be solvable due to an error within the cell (block 186), an error indication may be generated (block 188). Similarly, if the cell contents are determined to not be solvable due to an error in another cell (block 190), whether directly or indirectly referenced, the referenced cell containing the error is identified (block 192). An error indication is then generated (block 194) which, in certain embodiments, contains a link or other point to the error-causing cell. In the event corrections are made within an error-causing cell, a subsequent determination (block 182) may be made as to whether the contents of a cell are solvable and error indications may be updated based on this determination.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A processor-implemented method for tracking a spreadsheet error of a spreadsheet, comprising:
   upon entry of a formula into a cell, invoking a formula evaluation algorithm that incorporates error tracking;
   if the formula evaluation algorithm determines that no error is present in the cell, terminating execution of the formula evaluation algorithm and displaying an output of the formula in the cell;
   if the formula evaluation algorithm determines that an error is present in the cell, tracking the error to determine an error-causing cell and displaying an error indication in the cell;
   upon receipt of a user input selecting the error indication, displaying an error description box, overlaid on the spreadsheet, that provides text indicating a location of the error-causing cell and a navigable link to the error-causing cell if the error-causing cell is not the cell independent of additional user inputs within the error description box.

2. The processor-implemented method of claim 1, wherein the error description box indicates a nature of the error if the error-causing cell is the cell.

3. The processor-implemented method of claim 1, wherein tracking the error comprises tracing the error-causing cell through one or more cells directly or indirectly referenced by the formula to determine the error-causing cell.

4. The processor-implemented method of claim 1, further comprising:
   receiving an additional user input selecting the navigable link displayed in the error description box; and
   selecting the error-causing cell in response to receipt of the additional user input.

5. The processor-implemented method of claim 4, further comprising:
   displaying contents of the error-causing cell when the error-causing cell is selected.

6. A non-transitory, tangible computer-readable medium encoding processor-executable routines, wherein the routines, when executed by a processor cause:
   evaluating a calculation entered into a first cell of a table;
   upon determining that the calculation does not have an error present in the first cell, displaying an output of the calculation in the first cell;
   upon determining that the calculation is unsolvable due to an error in a second cell referenced by the calculation, displaying an error indication for the first cell;
   upon receiving a user input interacting with the error indication, tracking the error to determine a location of the second cell; and
   displaying an error description box, overlaid on the table, providing at least text indicating the location of the second cell and a navigable link to the second cell independent of additional user inputs within the error description box.

7. The non-transitory, tangible computer-readable medium of claim 6, wherein the second cell is referenced indirectly by the calculation.

8. The non-transitory, tangible computer-readable medium of claim 6, wherein the user input interacting with the error indication consists of a single click of the error indication.

9. The non-transitory, tangible computer-readable medium of claim 6, wherein the navigable link comprises one of a selectable button or a selectable hyperlink.

10. The non-transitory, tangible computer-readable medium of claim 6, wherein the routines, when executed by a processor, cause:
    selecting the second cell when an additional user input selecting the navigable link is received; and
    displaying an edit box for editing the contents of the second cell when the second cell is selected.

11. A processor-based system, comprising:
    a display;
    a memory storing one or more routines; and
    at least one processing component configured to execute the one or more routines stored in the memory, wherein the one or more routines, when executed by the at least one processing component, cause:
      displaying an interface screen of a spreadsheet application, wherein the interface screen comprises a plurality of cells;

upon entry of a formula within a first cell, executing a formula evaluation algorithm that analyzes the formula for error;

displaying an error indicator within the first cell if the formula evaluation algorithm determines an error exists that makes the formula unsolvable;

upon selection of the error indicator within the first cell, executing an error tracking algorithm that determines a second cell directly or indirectly referenced by the formula that is the source of the error; and displaying an error description box, overlaid on the interface screen, that provides at least text indicating a location of the second cell and a navigable link to the second cell independent of additional user inputs within the error description box.

12. The processor-based system of claim 11, wherein the selection of the error indicator within the first cell consists of a single click of the error.

13. The processor-based system of claim 11, wherein the one or more routines, when executed by the at least one processing component, cause:

upon interaction with the navigable link, selecting the second cell and displaying an editing box for editing the contents of the second cell.

14. The processor-based system of claim 13, wherein an additional error description is displayed when the second cell is selected, wherein the additional error description describes the error present in the second cell.

15. The processor-based system of claim 11, wherein the one or more routines, when executed by the at least one processing component, cause:

ceasing to display the error indicator in the first cell after the error is corrected in the second cell.

16. A processor-based system, comprising:

a display;

a memory storing one or more routines; and at least one processing component configured to execute the one or more routines stored in the memory, wherein the one or more routines, when executed by the at least one processing component, cause:

receiving a user interaction with an error indicator displayed within a cell of a spreadsheet;

in response to the user interaction, identifying an error-causing cell different from the cell that is a source of the error within the cell; and providing a navigable link to the error-causing cell in an error description box overlaid on the spreadsheet independent of additional user inputs within the error description box.

17. The processor-based system of claim 16, wherein the error indicator is generated by one or more evaluation algorithms incorporating error tracking.

18. The processor-based system of claim 16, wherein the error indicator is indicative of an unsolvable formula within the cell.

19. The processor-based system of claim 18, wherein the formula is unsolvable due to a root cause error within the error-causing cell.

20. The processor-based system of claim 18, wherein the error-causing cell is referenced directly or indirectly by contents of the cell.

21. A non-transitory, tangible computer-readable medium encoding processor-executable routines, wherein the routines, when executed by a processor cause:

in response to a first user input, identifying an error-causing cell responsible for an error identified in a cell of a spreadsheet;

displaying a navigable link to the error causing cell in an error description box overlaid on the spreadsheet independent of additional user inputs within the error description box;

receiving a second user input selecting the navigable link; and selecting the error-causing cell in response to the selection of the navigable link.

22. The non-transitory, tangible computer-readable medium of claim 21, wherein the first user input comprises a selection of an error indicator displayed in conjunction with the cell.

23. The non-transitory, tangible computer-readable medium of claim 21, wherein contents of the cell comprise a formula that directly or indirectly references the error-causing cell.

24. The non-transitory, tangible computer-readable medium of claim 21, wherein selecting the error-causing cell causes an error description to be displayed describing the error in the error-causing cell.

* * * * *